United States Patent [19]

Hiroyasu et al.

[11] Patent Number: 4,603,456
[45] Date of Patent: Aug. 5, 1986

[54] MACHINING EQUIPMENT FOR PRODUCTION LINES

[75] Inventors: Minoru Hiroyasu; Hitoshi Hashimoto; Susumu Yamada; Masaki Miyanaka; Hideharu Koizumi, all of Saitama, Japan

[73] Assignee: Honda Giken Kogyo Kabushiki Kaisha, Tokyo, Japan

[21] Appl. No.: 466,357

[22] PCT Filed: Jun. 16, 1982

[86] PCT No.: PCT/JP82/00230
§ 371 Date: Feb. 3, 1983
§ 102(e) Date: Feb. 3, 1983

[87] PCT Pub. No.: WO82/04414
PCT Pub. Date: Dec. 23, 1982

[30] Foreign Application Priority Data

Jun. 16, 1981 [JP] Japan ................... 56-93359

[51] Int. Cl.⁴ ............................ B23Q 39/04
[52] U.S. Cl. .................... 29/33 P; 29/563; 198/345; 198/346.1; 409/158; 409/174
[58] Field of Search ........ 408/33, 34, 49, 50, 408/62, 64; 409/172, 173, 174, 197, 198, 219, 221, 224, 225, 226, 145, 158, 159; 29/33 P, 563, 564, 568, 38 R, 38 A, 35.5, 36, 48.5 R, 48.5 A; 198/472, 742, 345, 339, 486

[56] References Cited

U.S. PATENT DOCUMENTS

| 2,672,675 | 3/1954 | Cross | 409/225 |
| 2,789,683 | 4/1957 | Stahl | 198/472 |
| 3,010,371 | 11/1961 | Riedel et al. | 198/742 |
| 4,050,355 | 9/1977 | Niskanen | 409/221 |
| 4,309,600 | 1/1982 | Perry et al. | 29/563 |
| 4,494,282 | 1/1985 | Ida et al. | 29/563 |

FOREIGN PATENT DOCUMENTS

| 31530 | 3/1980 | Japan | 29/563 |
| 9112 | 1/1981 | Japan | 409/174 |
| 1202363 | 8/1967 | United Kingdom | 29/33 P |

Primary Examiner—Gil Weidenfeld
Assistant Examiner—Daniel W. Howell
Attorney, Agent, or Firm—Irving M. Weiner; Joseph P. Carrier; Pamela S. Burt

[57] ABSTRACT

Machining equipment for a production line using pallet type jigs, which includes a plurality of pallet type jigs, a conveyance line capable of conveying the jigs, a work bench provided on the conveyance line, a spindle head capable of being fed back and forth with respect to the work bench, and a control system for controlling the conveyance line, the work bench, and the spindle head. On the work bench are provided a horizontal rotary table which is capable of turning and indexing at a desired angle and has a constant turning position, and two rails which are rotatable coaxially and integrally with the horizontal rotary table and disposed side by side in the vertical direction to extend in the horizontal direction, in order to follow the alterations of the machining angle of a workpiece held by the pallet type jig and further to carry the pallet type jig in and out of the work bench conveniently. The rails cooperate with each other to engage one of the pallet type jigs and are disposed collinearly with a pair of rails which are provided on the conveyance line for conveying the pallet type jig.

11 Claims, 5 Drawing Figures

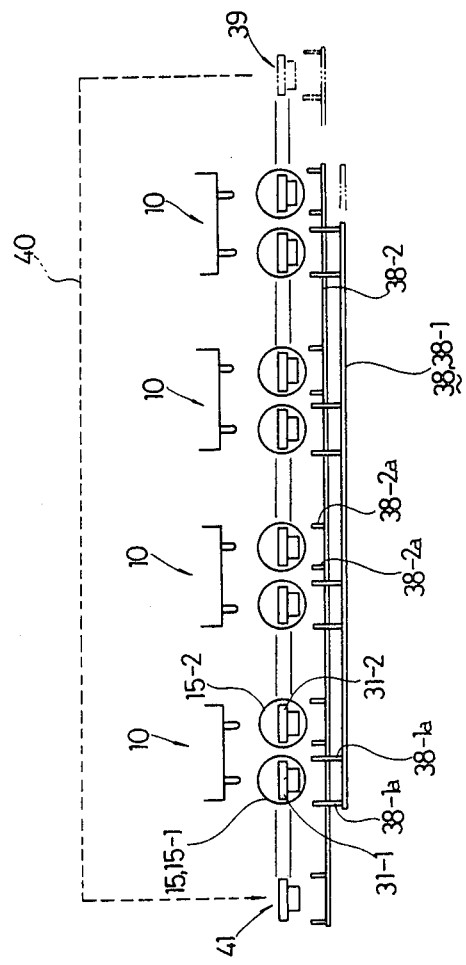

MACHINING EQUIPMENT FOR PRODUCTION LINES

FIELD OF ART

This invention relates to machining equipment for production lines and more particularly to machining equipment for production lines using a pallet type jig for holding a work which requires various angular machining operations for a bearing surface, such as the cylinder head of an internal combustion engine.

BACKGROUND ART

In the cylinder head of an internal combustion engine there usually are provided obliquely formed guide bores of intake and exhaust vlaves, and in the case of machining the cylinder head to make such angular bores, there have heretofore been manufactured cylinder head positioning jigs and guide bore forming machine tools especially suited for this purpose so as to have angles corresponding to the angles of guide bores in various types of internal combustion engines, because it is necessary to produce internal combustion engines in large quantities. Boring by cutting and other machining operations have been carried out for cylinder heads by using such manufactured jigs and machine tools. In automotive combustion engines, however, various types involving changes of the guide bore angle have recently been designed and manufactured because of diversification of demands, thus requiring an increased equipment cost. Particularly, in the case of conveyance pallet type jigs, there arises a problem with respect to space for storing the aforesaid jigs manufactured in large quantities because such type of jigs are relatively bulky. Besides, cylinder head positioning jigs must be machined to a high accuracy, and therefore it is very disadvantageous with respect to cost to manufacture new jigs for each new type of internal combustion engine. Under such circumstances, significant problems arise in attempting to manufacture a jig and a machine tool applicable to several types of internal combustion engines.

DISCLOSURE OF THE INVENTION

The present invention effectively overcomes the above-mentioned problems.

It is an object of the present invention to provide machining equipment in a production line having a plurality of pallet type jigs, a conveyance line capable of conveying the jigs, at least one work bench capable of receiving and delivering any one of the above jigs between it and the conveyance line, a spindle head positioned behind the work bench and capable of being fed back and forth and a control system for controlling the conveyance line, work bench and spindle head, whereby even for varying machining angles of works it is possible to effect machining using the same jig and work bench and thus versatility is provided for a plurality of different kinds of works, thereby making a common-use production and common use of work bench possible, and consequently the equipment cost can be reduced to a large extent.

It is another object of the present invention to provide machining equipment for production lines whereby in the aforementioned production line the carrying in and out of the jigs with respect to the work bench can be performed automatically and consequently the productivity can be improved.

In order to achieve the above-mentioned objects, the present invention provides machining equipment for a production line comprising a plurality of pallet type jigs, a conveyance line capable of conveying the jigs, at least one work bench capable of receiving and delivering any one of the jigs between it and the conveyance line, a spindle head positioned behind the work bench and capable of being fed back and forth and a control system for controlling the conveyance line, work bench and spindle head. The work bench having at least one horizontal rotary table capable of turning and indexing at a desired angle and having a constant turning position, and at least two holding rail members for holding any one of the jigs disengageably, the holding rail members being supported on the horizontal rotary table side by side in the vertical direction so as to be rotatable coaxially and integrally therewith and extending in the horizontal direction.

A preferred embodiment of the present invention will be described in detail hereinunder with reference to the accompanying drawings, from which further objects, advantages and features of the invention will become apparent.

BRIEF DESCRIPTION OF THE DRAWINGS

FIG. 5 is a plan view illustrating transfer bars as conveyance means and operation thereof.

BEST FORM FOR PRACTICING THE INVENTION

Figure 3:
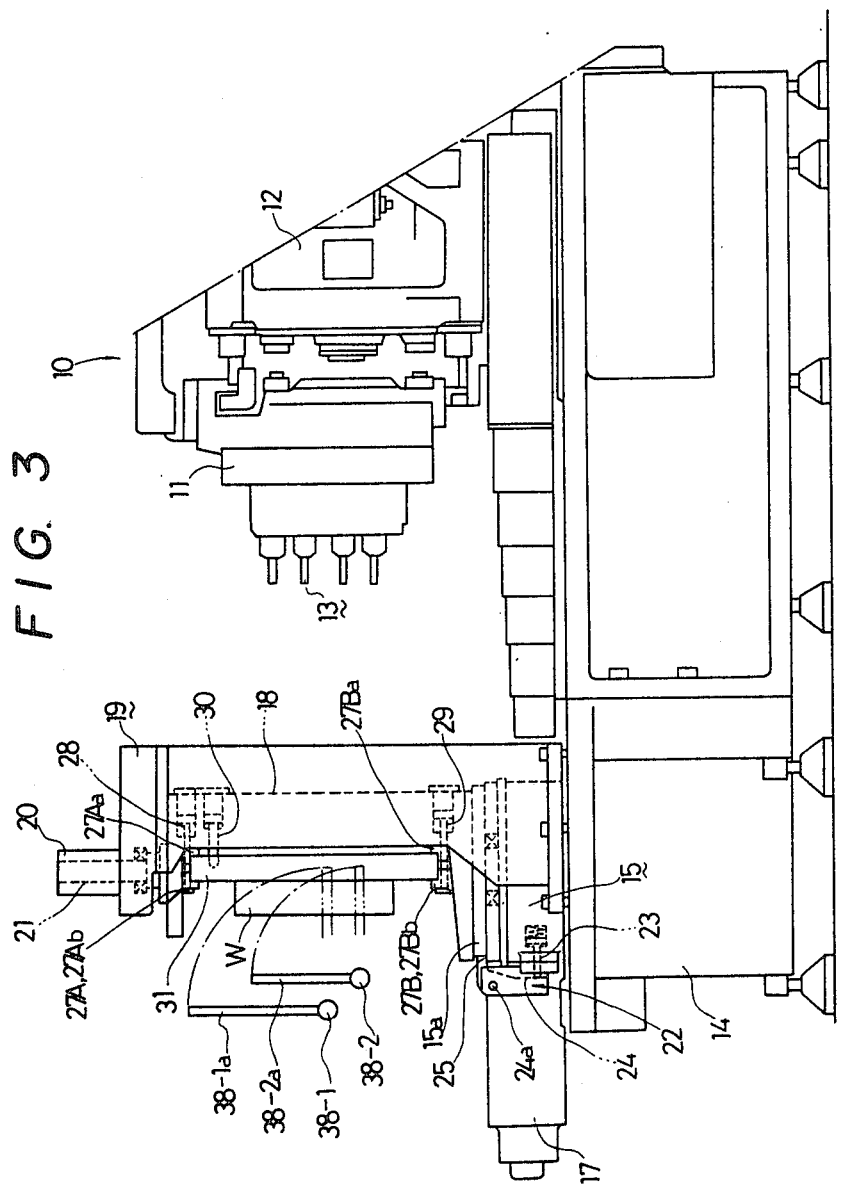
FIG. 3 is a side view of the equipment shown in FIG. 1.
Figure 4:
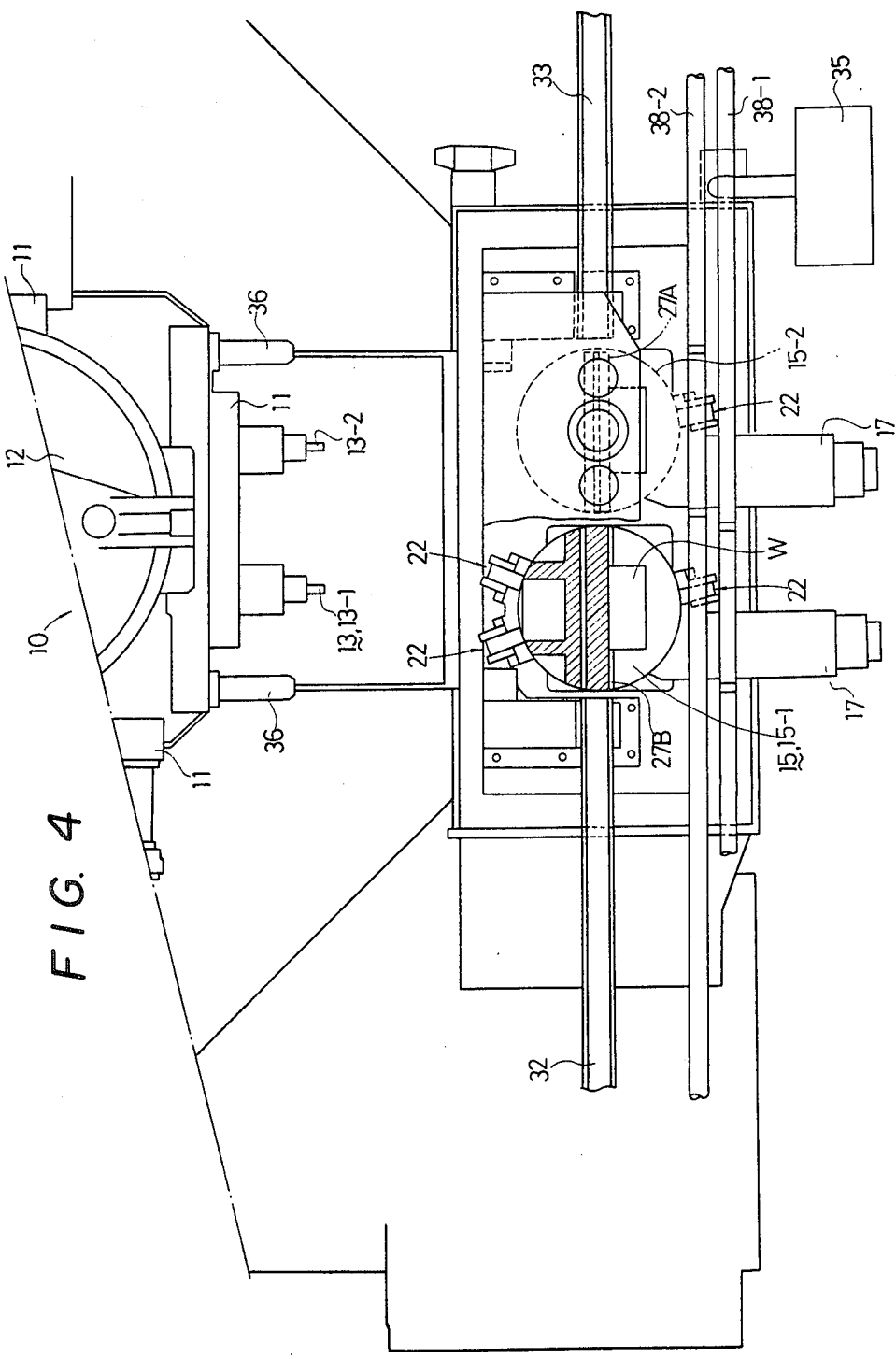
FIG. 4 is a partially cutaway plan view of the equipment shown in FIG. 1.

Referring first to FIGS. 3 and 4, there is shown a machine tool 10 for making an angular bore in a work W, the machine tool 10 being provided at its front face with a machining head 11. Four of the machining heads 11 are disposed respectively in front, in the rear, right and left of a body 12 which contains driving means, etc. Changing of the head disposed in the front is attained by turning of the machining heads 11 about the body 12. Thus, in this embodiment the machine tool 10 is of a spindle head changing type. The particular machining head 11 disposed in the front is brought into connection with driving means and is thereby moved forwardly to machine the work W. To each machining head 11 is attached a tool 13 such as a drill or a tap according to the kind of machining for the work W, the tool 13 being provided separately in right and left rows 13-1 and 13-2 as shown in FIG. 4.

Figure 1:
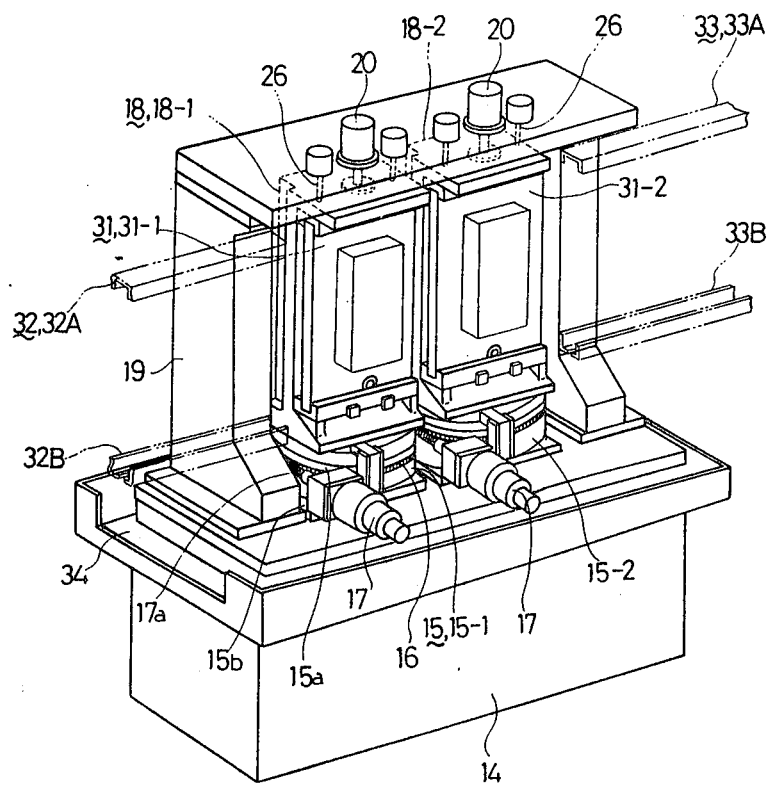
FIG. 1 is a perspective front view of equipment embodying the invention, exclusive of a machine tool.
Figure 2:
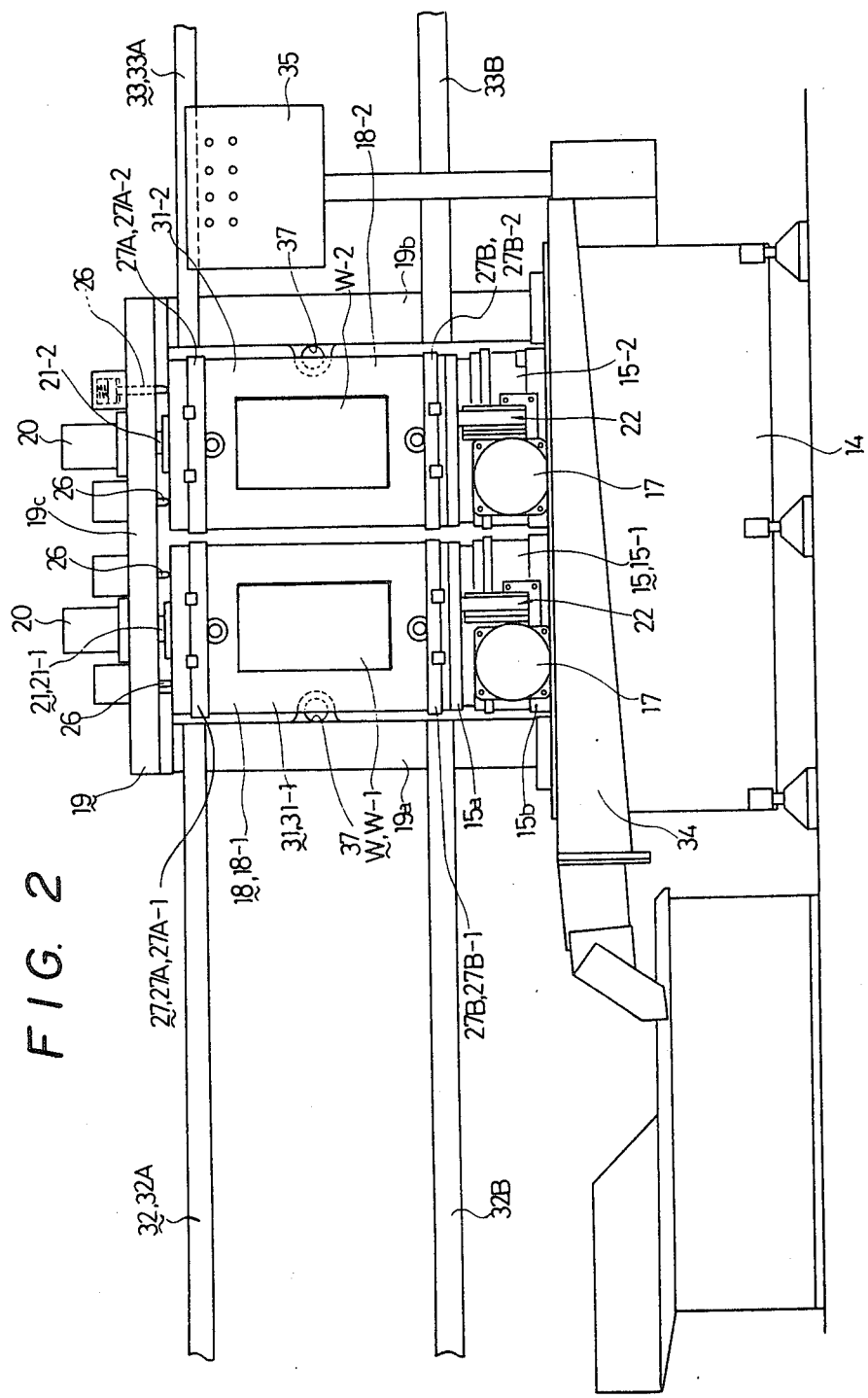
FIG. 2 is a front view of the equipment shown in FIG. 1.

In front of the machine tool 10 there is disposed a rotary table 15 which is mounted on a base 14. As shown in FIG. 2, the rotary table 15 is provided in a pair of two right and left rotary tables 15-1 and 15-2, respectively. The rotary table 15 comprises an upper swivel disk 15a and a lower base disk 15b. A ring gear 16 is formed on the swivel disk 15a and is in mesh with a worm gear 17a which serves as a driving shaft of a DC motor 17, as shown in FIG. 1. By driving of the motor 17 the swivel disk 15a effects a horizontal indexing with respect to the base disk 15b and stops at the indexed angle. More particularly, the motor 17 generates pulses along with rotation of the driving shaft and the worm gear 17a is driven by a semi-closed electrical circuit which corrects errors of index angle with such pulse signals and transmits power to the rotary table 15. Further, the motor 17 is a DC motor and the swivel stop angle of the rotary table 15 can be set to an extremely high accuracy close to infinity, by means of the semi-closed electrical circuit.

On each rotary table 15 is mounted a support member 18 as a jig body a pair of the jig bodies 18-1 and 18-2 being provided. Each support member 18 is fixed at its lower portion to the swivel disk 15a, so that it rotates about a vertical axis integrally with the swivel disk 15a. Mounted on the base 14 is a gate-shaped frame 19 comprising longitudinal frames 19a, 19b and a transverse frame 19c as shown in FIG. 2, and within the frame 19 are disposed the rotary table 15 and the support member 18. To the transverse frame 19c as an upper side member are attached center shafts 21 which are rotatable through bearings 20 so as to be concentric with the center of rotation of the rotary table 15, and the center shafts 21, more particularly 21-1 and 21-2, are mounted for the right and left support members 18-1 and 18-2, respectively, with lower ends of the center shafts 21-1 and 21-2 projecting from the transverse frame 19c and connected to the upper surfaces of the support members 18-1 and 18-2, respectively. Thus, the upper end of the support member 18 is journalled concentrically with the center of rotation of the rotary table 15.

As shown in FIG. 3, clamp means 22 is attached to the rotary table 15, the clamp means 22 comprising a piston-like pressure rod 23 and a clamp arm 24 adapted to be pivoted about a pin 24a by the urging force of the rod 23. The arm 24 is adapted to engage an annular groove 25 formed on the outer peripheral surface of the swivel disk 15a to press the latter, whereby the swivel disk 15a is fixed to the base disk 15b. A plurality of the rotary table clamping means 22, as shown in FIG. 4, are disposed about the rotary table 15 and for each of the rotary tables 15-1 and 15-2. As shown in FIG. 2, moreover, a piston-line clamp pin 26 which constitutes clamp means for the support member 18 is attached in a downwardly extending manner to the transverse frame 19c of the frame 19 so that it can project and retreat. Two of the clamp pins 26 are respectively disposed on both sides of each of the center shafts 21-1 and 21-2 with respect to each of the support members 18-1 and 18-2.

A rail 27 is mounted on the front face of the support member 18 which is upright on the rotary table 15, and the rail 27 comprises two upper and lower rails 27A and 27B which are parallel to the rotating surface of the swivel disk 15a of the horizontally rotating rotary table 15, the rails 27A and 27B comprising the combination of inside and outside rail portions 27Aa and 27Ab and that of inside and outside rail portions 27Ba and 27Bb, respectively, as shown in FIG. 3. The inside rail portions 27Aa and 27Ba are fixed to the front face of the support member 18, while the outside rail portions 27Ab and 27Bb are fixed to tip end portions of piston-like clamp pins 28 and 29, respectively, which are mounted to the support member 18. Along with advancement and retreat of the clamp pins 28 and 29, the outside rail portions 27Ab and 27Bb come close to and go away from the inside rail portions 27Aa and 27Ba, respectively. The two upper and lower rails 27A and 27B constituted of the inside and outside rail portions 27Aa, 27Ab, 27Ba and 27Bb adapted to change in spacing upon operation of the clamp pins 28 and 29 are formed as independent rails 27A-1, 27A-2, 27B-1 and 27B-2 for the right and left support members 18-1 and 18-2 as shown in FIG. 2. These independent rails 27A-1, 27A-2, 27B-1 and 27B-2 are disposed in series in the horizontal direction and are maintained at the same vertical spacing.

A pallet positioning piston-like pin 30 is attached to the support member 18 so that it can project and retreat from the front face of the support member 18 as shown in FIG. 3. The pallet positioning pin 30 is provided for each of the right and left support members 18-1 and 18-2.

As shown in FIG. 2, on the right and left sides of the frame 19 are horizontally disposed rails 32 and 33 for conveyance of a pallet 31. The pallet 31 is conveyed from left to right in FIG. 2, so that the left-hand rail 32 is a carrying-in rail and the right-hand rail 33 is a carrying-out rail. The right end of the carrying-in rail 32 is connected to and held by the longitudinal frame 19a of the frame 19 and its left end extends to the preceding machining step, while the left end of the carrying-out rail 33 is connected to and held by the longitudinal frame 19b of the frame 19 and its right end extends to the following machining step. The carrying-in and -out rails 32 and 33 comprise two upper and lower parallel rails 32A, 32B and 33A, 33B, respectively. These rails and the rails 27A, 27B mounted on the support member 18 are separated from each other, but their continuity is ensured so that the receiving and delivery of the pallet 31 can be effected. In this embodiment, the machining line extends so that the angular bore machining step by the machining equipment of the present invention and the aforesaid preceding and suceeding machining steps are arranged on a straight line. Therefore, the original position of the rotary table 15, namely, the position before the rotary table 15 starts rotation, is the same as its returned position after indexing angle and completion of machining. Because of this arrangement, the carrying -in and -out rails 32A, 32B, 33A and 33B are disposed in series with the rails 27A and 27B on the support member 18 in the original position of the rotary table 15. However, if the machining line is curved in the angular bore machining step by the machining equipment of the present invention, only the carrying-in rails 32A and 32B may be arranged in series with the rails 27A and 27B in the original position of the rotary table 15, while the carrying-out rails 33A and 33B may be disposed in series with the rails 27A and 27B in a returned position of the rotary table 15 at an angle different from the original position. Even in such an arrangement of the rails, the object and effect of the present invention, namely, an automatic carrying-in and -out of the pallet 31 with respect to the support member 18, can be attained.

In this embodiment the vertically disposed pallet 31 is conveyed while being supported in engagement with the upper and lower rails 32A, 32B, 33A and 33B, but the number of the carrying-in and -out rails is not limited thereto. Their number and position may be selected according to the shape of pallet, etc., and there may be disposed at least upper and lower rails necessary for supporting the vertically disposed pallet. The same can be said of the rail 27 mounted on the support member 18.

Reference numeral 34 shown in FIGS. 1 and 2 designates a discharge path for a cutting oil fed to the work W during the angular bore machining operation. The discharge path 34 is formed on the upper surface of the base 14 so as to surround the rotary tables 18-1 and 18-2.

Numeral 35 designates an operating panel for controlling the machine tool 10 and the rotary table 15.

The following description relates to the machining operation by means of the machining equipment of the present invention.

On the pallet 31 is positioned and mounted the work W such as the cylinder head of an internal combustion engine, that is, the pallet 31 serves as a work mounting jig. The pallet 31 in engagement with the carrying-in rail 32 is conveyed from the preceding machining step to the machining equipment of the present invention along the rail 32 by a suitable conveyance means, for example, by a transfer bar. Then, it transfers from the carrying-in rail 32 to the rail 27 on the support member 18 and is supported by engagement with the rail 27. In this way, the pallets 31-1 and 31-2 are supported by the support members 18-1 and 18-2, respectively. The right-hand pallet 31-2 in FIG. 2 transfers through the rails 27A-1 and 27B-1 of the left-hand support member 18-1 to the rails 27A-2 and 27B-2 of the right-hand support member 18-2. Thereafter, the pallet positioning pin 30 projects from the support member 18 and fits in a positioning hole formed in the back of the pallet 31 whereby the pallet 31 is positioned with respect to the support member 18. Next, the clamp pins 28 and 29 retreat, whereby the outside rail portions 27A*b* and 27B*b* constituting the rails 27A and 27B of the support member 18 are drawn inside, so that the pallet 31 is held between the inside and outside rail portions 27A*a*, 27B*a* and 27A*b*, 27B*b*, and thus the rails 27A and 27B serve as a clamp for the pallet 31. Thereafter, the support member 18 which supports the pallet 31 through the rails 27A and 27B functions as a jig body.

In the present invention, as mentioned above, the rail 27 of the support member 18 after receipt of the pallet 31 from the carrying-in rail 32 also serves as clamp means for the pallet 31, that is, the pallet 31 can be clamped by means of the rail 27 which originally is mounted on the support member 18 as a connection rail between the carrying-in and -out rails 32 and 33.

Subsequently, upon turning ON of the motor 17 the swivel disk 15*a* of the rotary table 15 begins to turn horizontally. The swivel disk 15*a*, support member 18, pallet 31 and work W turn integrally up to an angle set by a sequence circuit of the motor 17 according to the kind of work W attached to the pallet 31, and thus a desired angle-indexing is effected. After stopping of the swivel disk 15*a*, the disk 15*a* and the support member 18 are clamped by the clamp means 22 and the clamp pins 26, respectively. Then, the machining head 11 positioned at the front of the machine tool 10 advances and angular bores are formed in the work W by the tools 13 of the machining head 11. The forward movement of the machining head 11 in such machining operation is performed by a guide action such that two guide bars 36 of the head 11 as shown in FIG. 4 fit in guide holes 37 of the frame 19.

Because the above-described angular bore machining is a cutting work, a large machining load as a forward urging force is exerted on the support member 18 through the work W, but the upper end of the support member 18 is journalled by the center shaft 21 and in this embodiment the support member 18 is clamped by the clamp pins 26 in positions spaced from the center shaft 21. Therefore even though the lower portion of the support member 18 is connected to the rotary table 15, the angular boring can be effected while maintaining the angle of the support member 18 and the work W indexed with high accuracy by the aforesaid semi-closed electrical circuit and while maintaining the vertical posture thereof.

In the above-described angular boring operation, because the tools 13 are attached as separated right and left tools 13-1 and 13-2 to the machining head 11 as previously noted, the works W-1 and W-2 attached to the right and left pallets 31-1 and 31-2 are machined by the same machining head 11. Besides, the right and left works W-1 and W-2 can be rotated at different angles because the right and left rotary tables 15-1 and 15-2 are each rotated independently by separate motors 17, whereby angular bores having different angles can be formed for the works W-1 and W-2 by the same machining head 11. In this embodiment, moreover, the machine tool 10 is a spindle head changeable type machine tool capable of changing the machining head 11, so by turning the rotary tables 15-1 and 15-2 at every changing of the machining head 11 to change the angular posture of the works W-1 and W-2 with respect to the machine tool 10, it is possible to effect at the same machining station certain kinds of machining operations corresponding to the number of the rotary tables 15 multiplied by the number of the machining heads 11 provided in the machine tool 10, i.e., eight kinds in this embodiment.

Particularly according to the present invention, the angle of the work W with respect to the machine tool 10 can be changed by turning the pallet 31 through the rotary table 31, so that even if the angle of bore to be formed in the work W is changed, the machining concerned can be effected using the same pallet and the same machine tool 10. Additionally, even when different kinds of works W having different angles of angular bores are attached to the pallets 31 and are fed successively to the machining line, a series of machining operations can be performed automatically if the sequence circuit for controlling the motor 17 of the rotary table 15 is set according to the sequence of the work flow.

In addition to the aforementioned advantages, the present invention has the following feature. That is, although in this embodiment the pallet 31 is a vertical type while the carrying-in and -out rails 32, 33 and the rail 27 of the support member 18 are disposed up and down, it is technically possible to make the pallet a horizontal type by disposing these rails in positions of the same height in the longitudinal direction of the machine tool. In this case, however, the rail of the support member, along with rotation of the support member, projects to the machine tool side at a height interfering with the advancing level of the machining head, so that in a particular turning angle of the support member the machining head is incapable of advancing and the angle of angular bore capable of being formed in the work is thereby restricted. But such a problem does not occur in the aforesaid up and down arrangement of the rails 32, 33 and 27.

After completion of machining for the work W, the machining head 11 is retreated, the clamp of the clamp means 22 and that of the clamp pins 26 are released, allowing the rotary table 15 to be returned while rotating, then by the forward movement of the clamp pins 28 and 29 the clamp of the pallet 31 by the rail 27 is released and the positioning of the pallet 31 by the positioning pin 30 is released. Then, the pallet 31 is transferred from the rail 27 to the carrying-out rail 33 by the foregoing conveyance means and delivered to the following machining step. In this case, without sending both the right and left works W-1, W-2 to the following machining step, the left-hand work W-1 after machining at the left-hand rotary table 15-1 may be transferred to the rails 27A-2 and 27B-2 of the support member 18-2 on the rotary table 15-2 and be stopped there for its machining on the right-hand rotary table 15-2. By way of example, such a conveyance method is applied if the work W is a cylinder head and if guide bores of intake and exhaust valves are to be formed obliquely and symmetrically in the cylinder head.

Referring now to FIG. 5, there is shown a transfer means for carrying in and out of the pallets 31 for each rotary table 15 if a plurality of rotary tables 15 are disposed in front of the machine tool 10 as in this embodiment and a plurality of the machine tools 10 are disposed on a machining line. In parallel with the machining line are disposed transfer bars 38 in the same number as the number of the rotary tables 15 provided for each machine tool 10. In this embodiment, two transfer bars 38-1 and 38-2 are disposed which are provided with pawls 38-1a and 38-2a, respectively. The pawls 38-1a and 38-2a, as shown in FIG. 3, are adapted to rise and fall along with rotation of the transfer bars 38-1 and 38-2, and between horizontally fallen pawls 38-1a and 38-2a are held the pallets 31-1 and 31-2. The transfer bar 38-1 moves by a pitch equal to the spacing of the rotary tables 15-1 and 15-2 for the same machine tool 10, while the transfer bar 38-2 moves by a pitch equal to the spacing of the rotary tables 15-1 and 15-2 for adjacent machine tools 10, whereby the pallets 31-1 and 31-2 are carried in and out for each of the rotary tables for each machine tool 10, thus permitting a prompt conveyance without an idle pallet between the machine tools 10.

Work is removed from the pallet which has reached an end point 39 of the machining line, and the empty pallet returns through a circulation line 40 to a start point 41 of the machining line and waits for the coming work.

According to the present invention, as will be apparent from the foregoing description, a rotary table adapted to turn horizontally to index a desired angle is disposed in front of a machine tool and a support member is fixed to the rotary table, with a pallet carrying a work thereon being supported by the support member, so that it becomes possible to bore the work at a desired angle by rotation of the rotary table. Besides, versatility is provided for a plurality of different kinds of works to be bored at varying angles, and these works can be machined by the same pallet and machine tool. Such a common use of a pallet, etc. greatly contributes to the reduction in equipment cost and thus attains an outstanding effect. According to the present invention, moreover, rails adapted to engage and support a pallet are mounted on the support member, and of the carrying-in and -out rails disposed on both sides of the support member, at least the carrying-in rails are arranged in series with the rails on the support member in the original position of the rotary table, so that the carrying in and out of pallets with respect to the support member can be performed automatically. This feature, coupled with the aforesaid common use of a pallet, etc., permits a remarkable improvement in productivity.

INDUSTRIAL BENEFITS

The machining equipment of the present invention is beneficial for such a case as machining with various angles a workpiece held by the pallet type jig, or following the frequent alterations of the above machining angle. For example, this is very suitable for boring a guide bore of an inlet valve or an exhaust valve defined on a cylinder head of an internal combustion engine.

We claim:

1. Machining equipment for a production line, comprising:
    a base;
    a frame mounted on said base;
    at least one horizontal rotary table mounted on said base;
    means for indexing said horizontal rotary table;
    a support member fixed at a lower portion thereof to said horizontal rotary table and rotatably supported at an upper portion thereof to said frame concentrically with the center of rotation of said horizontal rotary table;
    a pair of holding rail members mounted on said support member;
    said holding rail members being adapted to hold a pallet type jig, being vertically spaced from each other, and extending in a horizontal direction;
    a spindle head for machining a workpiece on said jig;
    means for controlling said spindle head;
    a conveyance line adapted to convey said jig; and
    means for transferring said jig between said conveyance line and said holding rail members.

2. Machining equipment for a production line according to claim 1, wherein each of said holding rail members comprises an inside rail fixed to the front face of said support member and an outside rail mounted integrally with a plurality of rail pin members, said rail pin members being attached to said support member so that they can project and retreat in the longitudinal direction, and means being provided for reciprocating said rail in pin members.

3. Machining equipment for a production line according to claim 2, wherein said rotary table comprises a horizontally rotatable rotary table member, and plurality of table pin members arranged to press the circumferential wall of said rotary table, and means for moving said table pin members.

4. Machining equipment for a production line according to claim 1 wherein said conveyance line has at least one conveyance rail member for supporting said jigs conveyably, and at least one end portion of any one of said holding rail members is disposed in opposed relation to one end of said conveyance rail member.

5. Machining equipment for a production line according to claim 4, wherein said base has two said rotary tables, said spindle head is a multiple spindle type, and said conveyance line has two said conveyance rail members.

6. Machining equipment for a production line according to claim 5, wherein said two rotary tables are each provided with said two holding rail members, each rotary table has a constant turning position, and one of said holding rail members of one of said two rotary tables is in collinear relation to one of said holding rail members of the other rotary table when said one rotary table and the other rotary table are each in said constant position.

7. Machining equipment for a production line according to claim 6, wherein said holding rail members which in said collinear relation are aligned in series so as to be substantially continuous with each other.

8. Machining equipment for a production line according to claim 5, wherein one of said two conveyance rail members is arranged to carry in said jigs and the other is arranged to carry out said jigs.

9. Machining equipment for a production line according to claim 4, wherein said rotary table is provided in a first plurality thereof, and said conveyance rail member and said holding rail members are each provided in a second plurality thereof for each said rotary table.

10. Machining equipment for a production line according to claim 1, wherein said base is provided in a first plurality thereof, said rotary table is provided in a second plurality thereof for each said base, and said jig transferring means comprises said second plurality of conveyance bar members for supporting said jigs conveyably.

11. Machining equipment for a production line according to claim 10, wherein said conveyance bar members are each provided with a first plurality of pairs of pawl members, said pawl members being pivotable about the longitudinal axis of said conveyance bar member and capable of holding any one of said jigs therebetween.

* * * * *

UNITED STATES PATENT AND TRADEMARK OFFICE
CERTIFICATE OF CORRECTION

PATENT NO. : 4,603,456
DATED : August 5, 1986
INVENTOR(S) : Minoru HIROYASU et al It is certified that error appears in the above-identified patent and that said Letters Patent are hereby corrected as shown below:

Column 2, line 10 change "having" to --has--.

Signed and Sealed this

Sixth Day of January, 1987

*Attest:*

DONALD J. QUIGG

*Attesting Officer*   *Commissioner of Patents and Trademarks*